United States Patent
Mancini (10) Patent No.: US 9,789,657 B2
(45) Date of Patent: *Oct. 17, 2017

(54) PROCESS FOR BUILDING TYRES AND TYRE OBTAINABLE BY SAID PROCESS

(75) Inventor: Gianni Mancini, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 195 days.

This patent is subject to a terminal disclaimer.

(21) Appl. No.: 12/740,600

(22) PCT Filed: Oct. 31, 2007

(86) PCT No.: PCT/IB2007/054420

§ 371 (c)(1),
(2), (4) Date: Apr. 29, 2010

(87) PCT Pub. No.: WO2009/056907

PCT Pub. Date: May 7, 2009

(65) Prior Publication Data

US 2010/0258226 A1    Oct. 14, 2010

(51) Int. Cl.
*B29D 30/30*  (2006.01)
*B29D 30/16*  (2006.01)
(Continued)

(52) U.S. Cl.
CPC ....... *B29D 30/1621* (2013.01); *B29D 30/242* (2013.01); *B29D 30/305* (2013.01);
(Continued)

(58) Field of Classification Search
CPC ............ B29D 30/3028; B29D 30/3042; B29D 30/305; B29D 30/3057; B29D 30/36;
(Continued)

(56) References Cited

U.S. PATENT DOCUMENTS 3,184,361 A * 5/1965 Allitt .................... B29D 30/245
156/123
3,718,520 A * 2/1973 Leblond ............... B29D 30/245
156/400
(Continued)

FOREIGN PATENT DOCUMENTS

DE    10 2005 054 507 A1    5/2007
EP              66225 A2 * 12/1982
(Continued)

OTHER PUBLICATIONS

European Search Report for International Application No. PCT/IB2007/054420, mailing date Jul. 16, 2008.
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

In a process for building tires, a carcass structure which includes at least one carcass ply and a belt structure, is formed. Manufacture of the belt structure includes: forming a first portion of at least one cushion insert through spiralling of a continuous elongated element; forming at least one first belt layer in a radially external position to the first portion in such a manner that the first portion axially projects from one of the axially opposite side edges of the first belt layer, forming a second portion of the cushion insert through spiralling of a continuous elongated element in a radially external position to the side edge of the first belt layer and to a stretch of the first portion projecting from the side edge itself, so as to enclose the side edge between the first and second portions of the cushion insert.

17 Claims, 7 Drawing Sheets

(51) Int. Cl.
*B29D 30/70* (2006.01)
*B29D 30/24* (2006.01)
*B60C 9/18* (2006.01)

(52) U.S. Cl.
CPC ..... *B29D 30/3021* (2013.01); *B29D 30/3028* (2013.01); *B29D 30/3057* (2013.01); *B29D 30/70* (2013.01); *B60C 9/1835* (2013.01); *Y10T 152/10054* (2015.01); *Y10T 152/10783* (2015.01)

(58) Field of Classification Search
CPC ........ B29D 30/42; B29D 30/38; B29D 30/60; B29D 30/70; B29D 2030/385; B29D 2030/705
USPC ....... 156/111, 117, 123, 124, 130, 133, 417; 152/532, 537
See application file for complete search history.

(56) References Cited

U.S. PATENT DOCUMENTS

| | | | |
|---|---|---|---|
| 3,990,931 | A | 11/1976 | Leblond et al. |
| 4,082,132 | A * | 4/1978 | Arai et al. ................. 152/209.5 |
| 4,683,928 | A | 8/1987 | Yahagi |
| 4,894,409 | A | 1/1990 | Shimada et al. |
| 5,215,612 | A | 6/1993 | Motomura et al. |
| 5,248,357 | A | 9/1993 | Miyanaga et al. |
| 7,306,021 | B2 | 12/2007 | Tsuruta |
| 8,029,632 | B2 | 10/2011 | Seevers et al. |
| 9,216,551 | B2 * | 12/2015 | Marchini ............... B29D 30/20 |
| 2001/0017179 | A1 | 8/2001 | Tsuruta |
| 2002/0153083 | A1 * | 10/2002 | Takagi .......................... 156/121 |
| 2003/0051794 | A1 * | 3/2003 | Suda et al. ................... 156/123 |
| 2003/0102088 | A1 * | 6/2003 | Iiduka ........................ 156/394.1 |
| 2005/0067080 | A1 | 3/2005 | Ferlin |
| 2005/0145314 | A1 | 7/2005 | Ikeda et al. |
| 2006/0090836 | A1 | 5/2006 | Caretta et al. |
| 2007/0102088 | A1 | 5/2007 | Hayashi et al. |
| 2007/0102090 | A1 * | 5/2007 | Kabe et al. .................. 152/538 |
| 2008/0087367 | A1 | 4/2008 | Lacagnina et al. |

FOREIGN PATENT DOCUMENTS

| | | |
|---|---|---|
| EP | 0 419 142 A2 | 3/1991 |
| EP | 0 537 780 A2 | 4/1993 |
| EP | 0 613 757 A1 | 9/1994 |
| EP | 0 976 585 A2 | 2/2000 |
| EP | 1 122 098 A2 | 8/2001 |
| EP | 1 170 151 A2 | 1/2002 |
| EP | 1 785 284 A2 | 5/2007 |
| JP | 3-101922 | 4/1991 |
| JP | 4-219225 | 8/1992 |
| JP | 06-087302 A | 3/1994 |
| JP | 2003-213043 A | 7/2003 |
| JP | 2005-324494 | 11/2005 |
| JP | 2006-232895 A | 9/2006 |
| WO | WO 00/44547 | 8/2000 |
| WO | WO 01/36185 A1 | 5/2001 |
| WO | WO 01/38077 A1 | 5/2001 |
| WO | WO 03/074297 A1 | 9/2003 |
| WO | WO 2004/022322 A1 | 3/2004 |
| WO | WO 2005/095092 A1 | 10/2005 |
| WO | WO-2006/066602 A1 * | 6/2006 |

OTHER PUBLICATIONS

Communication Pursuant to Article 94(3) EPC issued by European Patent Office on Oct. 22, 2012.
Notification of the First Office Action issued Aug. 2, 2012 by State Intellectual Property Office of the People's Republic of China in corresponding Application No. CN 200780101065.3 (8 pages).
English-language translation of Notification of the First Office Action issued Aug. 2, 2012 by State Intellectual Property Office of the People's Republic of China in corresponding Application No. CN 200780101065.3 (10 pages).
Advisory Action mailed Jun. 13, 2013, in co-pending U.S. Appl. No. 12/738,516 (3 pages).
English-language translation of Notice of Reasons for Rejection issued Nov. 13, 2012 by Japan Patent Office in Application No. JP 2010-530618 (4 pages).
European Search Report for International Application No. PCT/IB2008/054497, mailed Apr. 8, 2009.
Final Office Action mailed Feb. 25, 2015, in co-pending U.S. Appl. No. 12/738,516 (13 pages).
Final Office Action mailed Feb. 5, 2013, in co-pending U.S. Appl. No. 12/738,516 (10 pages).
Notice of Reasons for Rejection issued Nov. 13, 2012 by Japan Patent Office in Application No. JP 2010-530618 (3 pages).
Office Action mailed Jun. 30, 2014, in co-pending U.S. Appl. No. 12/738,516 (11 pages).
Office Action mailed Sep. 12, 2012, in co-pending U.S. Appl. No. 12/738,516 (9 pages).
Restriction Requirement mailed Jun. 14, 2012, in co-pending U.S. Appl. No. 12/738,516 (5 pages).

* cited by examiner

PROCESS FOR BUILDING TYRES AND TYRE OBTAINABLE BY SAID PROCESS

CROSS REFERENCE TO RELATED APPLICATION

This application is a national phase application based on PCT/IB2007/054420, filed Oct. 31, 2007, the content of which is incorporated herein by reference.

BACKGROUND OF THE INVENTION

Field of the Invention

The present invention relates to a process for building tyres and to a tyre obtainable by said process.

Description of the Related Art

A tyre for vehicle wheels generally comprises a carcass structure including at least one carcass ply having respectively opposite end flaps in engagement with respective annular anchoring structures, integrated into the regions usually identified with the name of "beads", defining the radially internal circumferential edges of the tyre.

Associated with the carcass structure is a belt structure comprising one or more belt layers, placed in radially superposed relationship relative to each other and to the carcass ply and having textile or metallic reinforcing cords with a crossed orientation and/or substantially parallel to the circumferential extension direction of the tyre. At a radially external position to the belt structure a tread band is applied that is also made of elastomeric material like other semifinished products constituting the tyre.

In addition, respective sidewalls of elastomeric material are applied at an axially external position, to the side surfaces of the carcass structure, each extending from one of the side edges of the tread band until close to the respective annular anchoring structure to the beads.

In tyres of the tubeless type, an airtight coating layer usually termed "liner" covers the inner tyre surfaces.

Within the present specification and the appended claims, by the term "elastomeric material" it is intended a compound comprising at least one elastomeric polymer and at least one reinforcing filler. Preferably, this compound further comprises additives such as cross-linking agents and/or plasticizers. Due to the presence of the cross-linking agents, this material can be cross-linked by heating so as to form the final article of manufacture.

In tyres intended for particularly heavy-duty vehicles and/or for High Performance and Ultra High Performance cars and racing cars, application of so-called "cushion inserts" is required which are disposed astride the side, i.e. axially external, edges of the belt layers to protect the carcass plies and/or other adjacent components from direct contact with the ends of the metal cords forming the belt structure.

In traditional processes for tyre manufacture, the carcass structure and belt structure, together with the respective tread band, are provided to be made separately from each other through assembly of semifinished components at respective work stations, to be mutually assembled at a later time, as disclosed in document U.S. Pat. No. 3,990,931 or document EP 0 613 757, for example.

In relatively recent times, production processes have been developed which are such conceived as to avoid production and storage of semifinished products. For instance, in document WO 01/36185 in the name of the same Applicant, a robotized arm carries a toroidal support on which each of the components of a tyre under production is directly made. The robotized arm gives the toroidal support a circumferential distribution motion around its geometric axis, simultaneously with controlled transverse-distribution displacements in front of a member supplying a continuous elongated element of elastomeric material. The continuous elongated element thus forms a plurality of coils the orientation and mutual-superposition parameters of which are managed in such a manner as to control variations in the thickness to be given to a component of a tyre being manufactured, based on a predetermined laying scheme previously inputted into an electronic computer.

EP 0 976 585 discloses a cushion insert formed with an outer layer and an inner layer of different compositions, in which the outer layer has a 100% higher module than that of the inner layer, and the inner layer has a 100% higher module than that of a rubberizing material of the belt layer onto which the cushion insert is applied.

EP 1 170 151 discloses a cushion insert separating the end portions of two adjacent belt layers. The cushion insert extends in an axially external direction from one end of one of the belt layers of smaller width, and comprises an inner portion separating the end portions of the belt layers from each other, and an outer portion extending from the inner portion to the outside of the tyre and having at least two different elastomeric compositions, the elasticity moduli of the different portions of which have a predetermined mutual relation.

SUMMARY OF THE INVENTION

The Applicant has noticed that obtaining cushion inserts as described in documents EP 0 976 585 and EP 1 170 151 by means of the building processes disclosed in U.S. Pat. No. 3,990,931 and EP 0 613 757 for example, would not ensure a satisfactory accuracy in positioning the inserts themselves relative to the axially external edges of the belt structure, which is particularly indispensable in the field of manufacturing tyres for high performance and ultra high performance vehicles. In addition, due to the unavoidable presence of junctions between the different semifinished products to be assembled, these tyres may not operate in a sufficiently efficient manner as compared with the required specifications.

The Applicant has further felt that a greater operating flexibility is required in relation to the geometric and structural features and the characteristics of the materials to be used, as regards the cushion inserts to be integrated into the tyre being manufactured.

In the most recent building processes of the type depicted in WO 01/36185 for example, it is not known which operating sequence is to be adopted in order to make said cushion inserts while at the same time avoiding the above mentioned drawbacks and ensuring the requirements specified above.

Based on the above, the Applicant has sensed that manufacture of the cushion inserts through spiralling of a continuous elongated element would allow more accuracy in positioning the inserts themselves relative to the axially external edges of the belt structure. The Applicant has also realised that manufacture of the cushion inserts through spiralling of a continuous elongated element would enable more operative flexibility in the geometric and dimensional features and in terms of materials used as regards the cushion inserts themselves during manufacture, so that these features can be instantaneously adapted to the production requirements.

In accordance with the present invention, the Applicant has found that in the manufacture of cushion inserts the above described requirements can be satisfied by making at least two distinct portions of the cushion insert itself separately from each other through a spiralling operation carried out in two or more distinct steps, said portions being respectively applied radially internally and radially externally of the belt layer or layers forming the belt structure.

According to a first aspect the invention relates to a process for building tyres comprising the steps of:

forming a carcass structure including at least one carcass ply having opposite edges in engagement with respective annular anchoring structures;

forming a belt structure comprising at least one first belt layer and at least one cushion insert enclosing an axially external edge of said at least one first belt layer between its ends;

forming a tread band at a position radially external to said belt structure;

wherein the step of forming said belt structure comprises at least the steps of: forming a first portion of said at least one cushion insert through laying of at least one continuous elongated element of elastomeric material into coils disposed close to each other on a laying surface; forming said at least one first belt layer at a radially external position to said first portion in such a manner that said first portion axially projects outwards from one of the axially external opposite edges of said at least one first belt layer; forming a second portion of said cushion insert through laying of at least one continuous elongated element of elastomeric material into coils disposed close to each other in a radially external position to said axially external edge of said at least one first belt layer and to a stretch of the first portion projecting from the same axially external edge in an axially external direction, so as to enclose said axially external edge between the first and second portions of the cushion insert.

The spiralling operation enables the individual portions of the cushion insert to be made directly in contact with the laying surface carried by a primary drum or presented by other tyre components, so as to ensure an optimal precision in mutual positioning of the individual parts forming the cushion inserts, the belt structure and/or other components of the tyre itself. The spiralling operation also allows elimination of any discontinuity that could occur due to the end-to-end junctions required by known processes for manufacture of the cushion inserts.

Manufacture of the cushion inserts by spiralling in several distinct steps alternated with laying of one or more belt layers respectively, also allows more operating flexibility in choosing the materials and the geometric conformations to be given to each of the cushion insert portions.

According to another aspect, the invention relates to a tyre built by adopting said process.

The present invention in at least one of said aspects can show at least one of the following preferred features.

At least one second belt layer can be applied to said first belt layer, in a radially superposed relationship therewith.

Coupling of at least one second belt layer can be carried out before application of the second portion of the cushion insert.

The second portion of the cushion insert can be formed in superposed relationship with an axially external edge of the second belt layer, so as to enclose the axially external edges of said first and second belt layers between the first and second portions of the cushion insert.

According to a possible alternative embodiment, coupling of the second belt layer is carried out after application of the second portion of the cushion insert.

The second portion of the cushion insert can be partly enclosed between an axially external edge of the second belt layer and the axially external edge of the first belt layer.

A third portion of said cushion insert can be formed by laying at least one continuous elongated element of elastomeric material into coils disposed close to each other at a position radially external to said axially external edge of the second belt layer and on a stretch of the second portion projecting from said axially external edge in an axially external direction, so as to enclose said axially external edge of the second belt layer between the second and third portions of the cushion insert.

The elastomeric material constituting said continuous elongated element preferably is of a different composition from that of an elastomeric material constituting the tyre tread band and sidewalls, respectively.

Preferably, the elastomeric material constituting said continuous elongated element may comprise at least one rubber-metal bond promoter.

Said at least one first belt layer can be formed by application of belt strip-like elements disposed consecutively close to each other along the circumferential extension of the laying surface.

Coupling of said first portion of the cushion insert to one of the axially external opposite edges of said at least one first belt layer can be in any case carried out through application of said at least one first belt layer around the laying surface, causing partial overlapping between one of the axially external opposite edges of the first belt layer and the first portion of the cushion insert.

For instance, the first portion of the cushion insert can be formed on an auxiliary drum carrying said laying surface.

Before forming said at least one first belt layer, the auxiliary drum is preferably set to a first work diameter of such a value that each of said belt strip-like elements applied subtends an arc of a circumference on the laying surface having a width equal to a submultiple integer of the overall circumferential extension of the laying surface itself.

After application of said at least one first belt layer the auxiliary drum can be radially expanded until a predetermined second work diameter to cause permanent expansion of said at least one first belt layer.

After said radial expansion step, the auxiliary drum is contracted to a diameter smaller than the first work diameter and the belt structure formed on the auxiliary drum is slipped off the same.

Before forming the first portion of said cushion insert, the auxiliary drum is preferably set to a minimum diameter smaller than the first work diameter.

The auxiliary drum can comprise consecutive circumferential sectors having respective circumferential shoulders on the laying surface, which shoulders mutually abut when the auxiliary drum is set to the minimum diameter.

The carcass structure can be formed on a primary drum through application of at least one carcass ply obtained from at least one semifinished product in the form of a continuous strip wound around the primary drum itself.

According to a possible alternative embodiment, the carcass structure is formed on a primary drum through application of at least one carcass ply obtained from a plurality of carcass strip-like elements laid down in mutually approached relationship along the circumferential extension of said primary drum.

The belt structure is coupled to said carcass structure at a radially external position.

Coupling of the belt structure to the carcass structure can comprise the steps of: positioning the belt structure around the carcass structure; radially expanding the carcass structure until causing application of same against an inner surface of the belt structure.

According to a possible variant, the first portion of the cushion insert is formed on said carcass structure defining said laying surface.

An axially external edge of said first portion can be radially superposed on a radially external apex of a respective tyre sidewall, previously applied onto said at least one carcass ply.

The step of coupling said first portion of the cushion insert to one of the axially external opposite edges of said at least one first belt layer is carried out concurrently with coupling of the belt structure to the carcass structure, by partly superposing one of the axially external opposite edges of said at least first belt layer on the first portion of the cushion insert.

Coupling between the belt structure and carcass structure is carried out by forming the belt structure directly on the carcass structure.

Said at least one carcass ply can be formed through laying of carcass strip-like elements disposed consecutively close to each other along the circumferential extension of a toroidal support.

According to an embodiment of said building process, said toroidal support conforms in shape to the inner configuration of the tyre being manufactured.

Said at least one first belt layer can be formed through application of strip-like elements disposed consecutively close to each other along the circumferential extension of the carcass structure.

Further features and advantages will become more apparent from the detailed description of a preferred but not exclusive embodiment of a process for building tyres and a tyre obtainable by said process, in accordance with the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

With reference to the drawings, an apparatus for manufacturing tyres for vehicle wheels designed to carry out the process according to the present invention has been generally identified with reference numeral 1.

Figure 5:
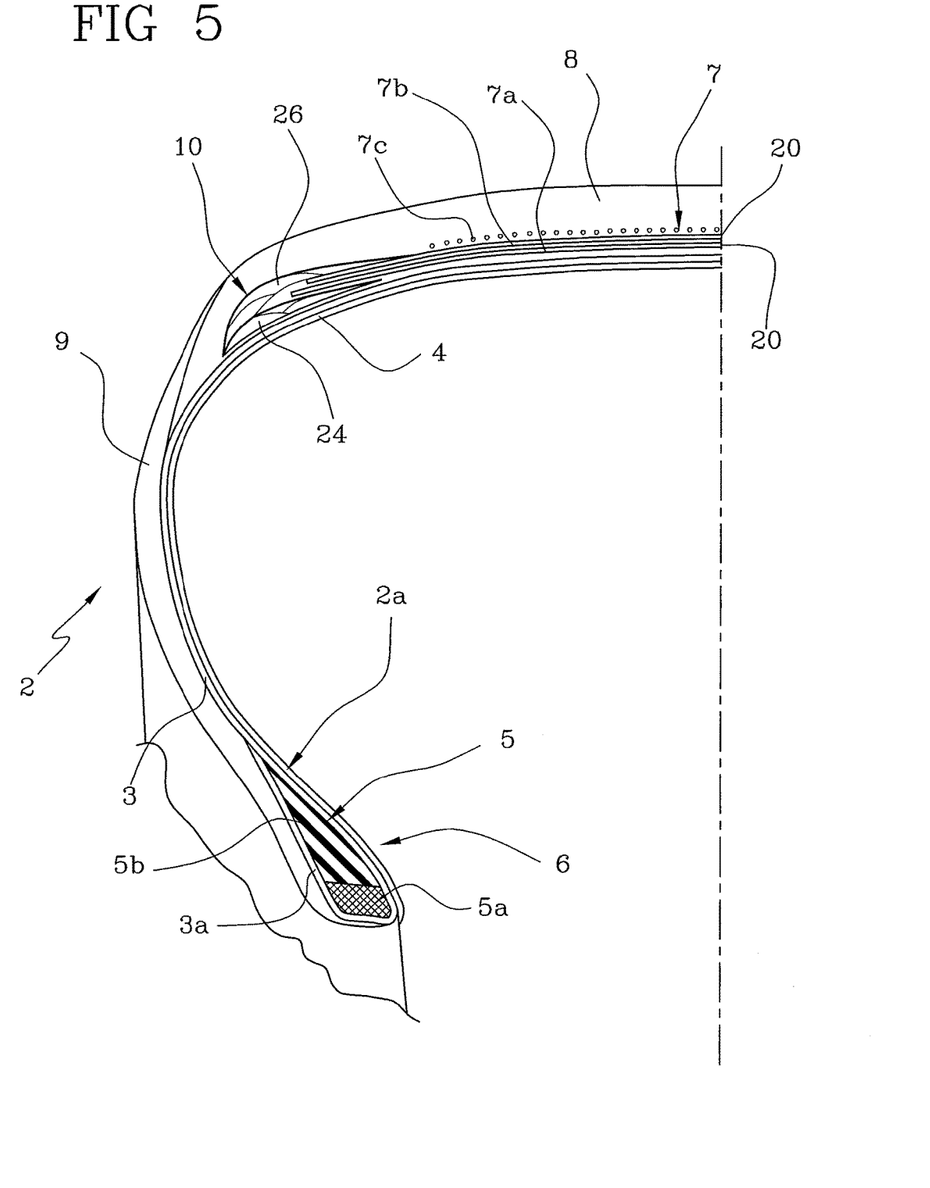
FIG. 5 is a fragmentary diametrical section view of a tyre obtainable by the process and apparatus referred to in the preceding FIGS. 2-4.
Figure 6:
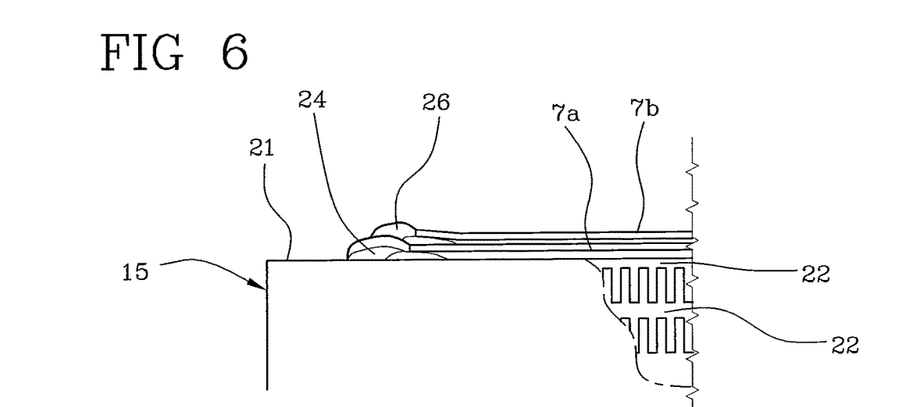
FIG. 6 shows a step in which, according to an alternative embodiment of the working process, a second belt layer is formed in radially superposed relationship with the second portion of the cushion insert.
Figure 7:
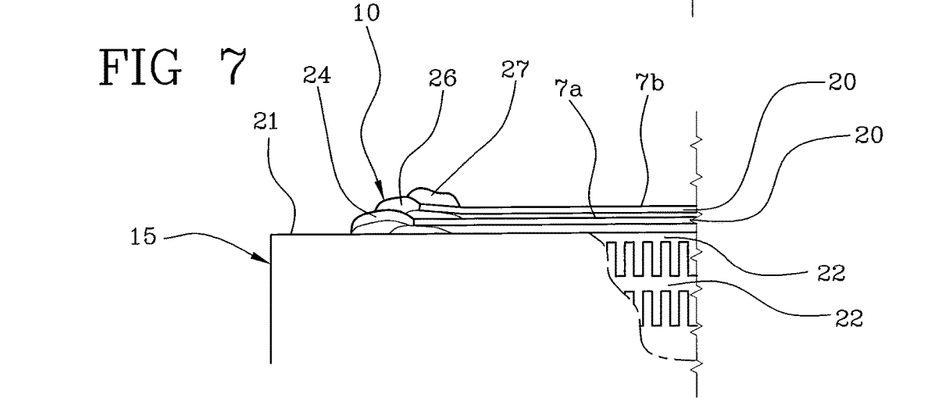
FIG. 7 shows a working step subsequent to that in FIG. 6, in which a third portion of a cushion insert is formed.
Figure 8:
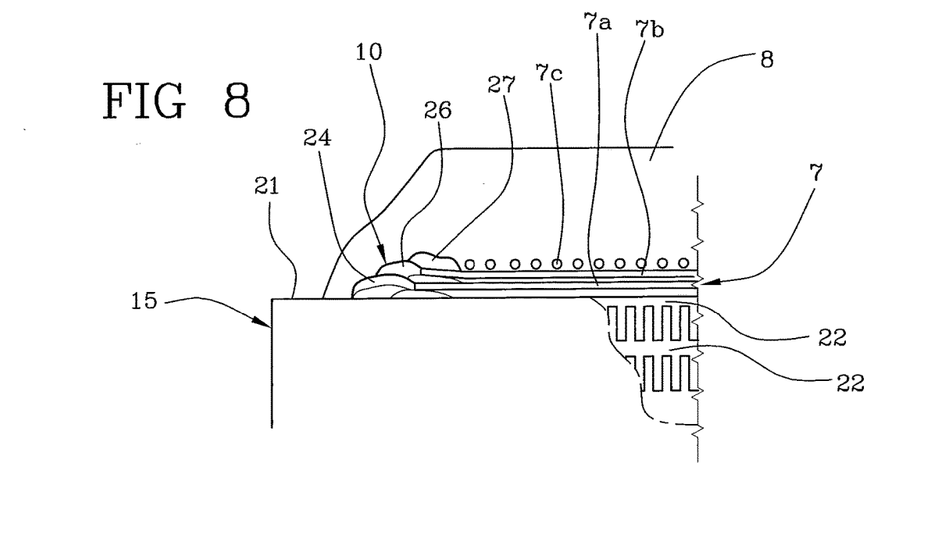
FIG. 8 shows a working step subsequent to that in FIG. 7, in which a third belt layer and a tread band radially superposed on the belt layer are formed.

Apparatus 1 is intended for manufacture of tyres 2 (FIGS. 5 and 10) essentially comprising a carcass structure 2a having at least one carcass ply. A layer of airtight elastomeric material, a so-called liner, can be applied internally of the carcass ply/plies 3. Two annular anchoring structures 5 each comprising a so-called "bead core" 5a associated with an elastomeric filler 5b, are in engagement with respective end flaps 3a of the carcass ply/plies 3. Two regions usually identified as "beads" 6, at which usually engagement between tyre 2 and a respective mounting rim occurs, enclose said annular anchoring structures 5.

A belt structure 7 comprising one or more belt layers 7a, 7b, 7c is circumferentially applied to the carcass ply/plies 3, and a tread band 8 circumferentially overlaps the belt structure 7.

Two sidewalls 9, each extending from the corresponding bead 6 to a corresponding side edge of the tread band 8, are applied at laterally opposite positions to the carcass ply/plies 3.

Associated with the belt structure 7 are so-called "cushion inserts" 10 each placed astride one of the axially external edges of the belt layer/layers 7a, 7b, so as to enclose the axially external edge itself between the ends thereof.

Figure 1:
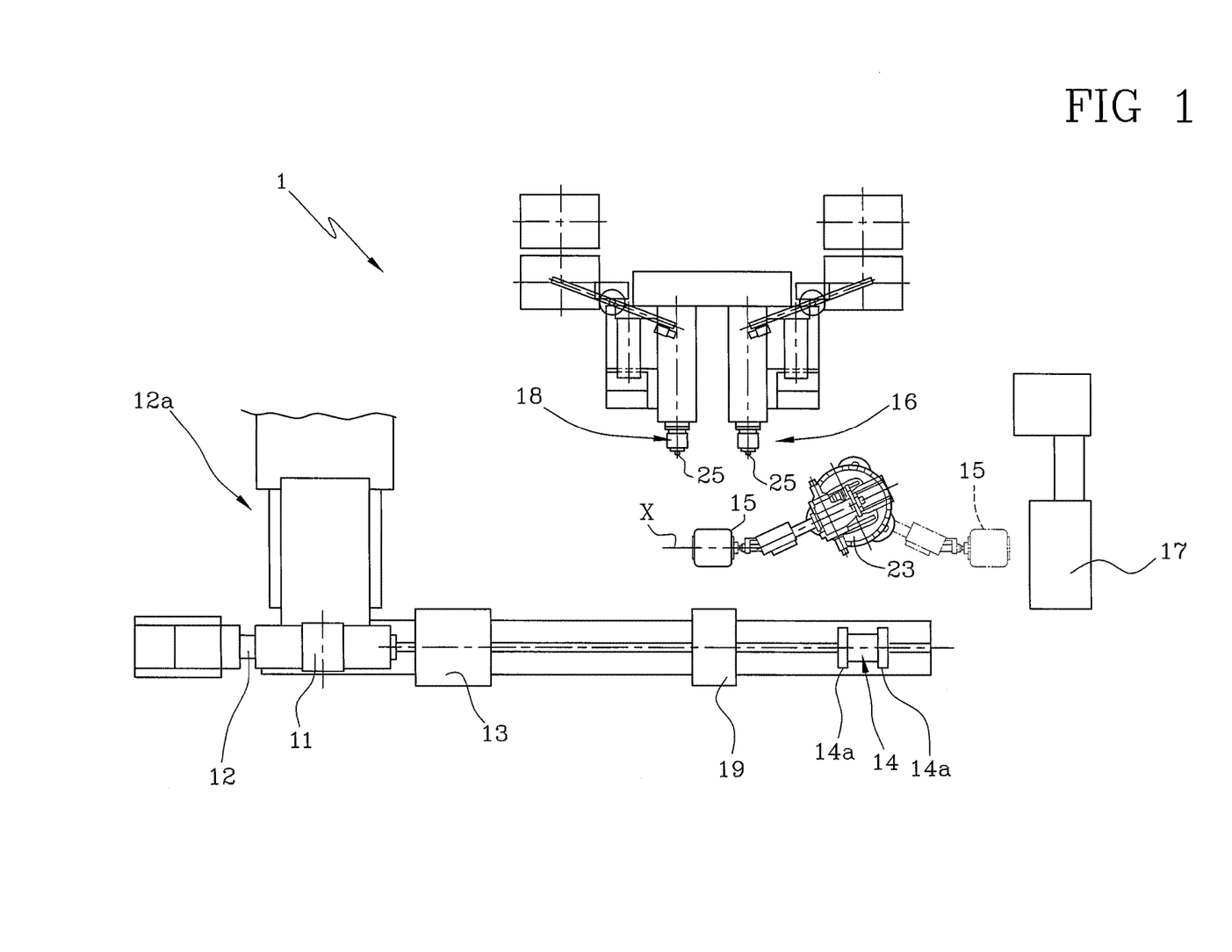
FIG. 1 diagrammatically shows a top view of an apparatus for manufacturing tyres in accordance with the present invention.

With reference to a first preferred embodiment, shown in FIG. 1, apparatus 1 comprises a primary building drum 11, on which at least part of the components designed to form the carcass structure 2a of tyre 2 are built and/or assembled. The primary drum 11 can indifferently consist either of a first stage building drum if, as in the example shown, apparatus 1 is designed to carry out a building process of the so-called "two stage" type, or of a building drum usually termed "unistage", if a building process in a single stage is wished to be carried out.

Here and in the following of the specification and the attached claims, by "unistage building process" it is intended a process in which the carcass structure is not demounted from its building drum until the end of the tyre building operation; and by "two-stage building process" it is intended a process in which the carcass structure is demounted from its building drum just after being built into a cylindrical form to be subsequently transferred to a shaping drum for assembly with the respective belt structure.

The primary drum 11 is operatively supported by a mandrel 12 or a robotized arm or other device enabling it, if necessary, to be driven in rotation and/or suitably moved during application of the components of the carcass structure 2a in at least one building station 12a.

In more detail, the primary drum 11 lends itself to first receive liner 4, if any, and then the carcass ply or plies 3, so as to form a cylindrical sleeve on the opposite end flaps of which the annular anchoring structures 5 are subsequently fitted. Turning-up of the end flaps 3a of the carcass ply/plies 3 around the annular anchoring structures 5 can be subsequently carried out. Further provided can be application of the sidewalls 9 on the primary drum 11, carried out before or after application of the carcass ply/plies 3, depending on the building process.

In the embodiment shown in FIG. 1 where tyre building takes place by a two-stage process, the carcass structure 2a, made in the form of a cylindrical sleeve, is picked up from the primary drum 11 by a first transfer member 13 carrying out engagement of same on a shaping drum 14 or second-stage drum, axially divided into two halves 14a susceptible of being moved close to each other and designed to engage the carcass structure 2a, each at one of the annular anchoring structures 5.

Apparatus 1 may further comprise an auxiliary drum 15 on which the components of the belt structure 7 coming from a first feeding unit 16 designed to obtain the cushion inserts 10, and from a second feeding unit 17 designed to obtain the belt layer or layers 7a, 7b, 7c, are assembled following a predetermined sequence.

Also interlocked with the auxiliary drum 15 can be a third feeding unit 18 designed to apply the tread band 8 at a radially external position to the belt structure 7.

At least one further feeding unit (not shown) can be provided for application of the sidewalls 9 in the extension of the axially opposite edges of the tread band 8, as an alternative to application of same on the primary drum 11.

A possible second transfer member 19, movable between the auxiliary drum 15 and shaping drum 14, preferably along a direction of mutual axial alignment of the latter, carries out transfer of the belt structure 7 together with the tread band 8 and sidewalls 9 possibly associated therewith, onto the carcass structure 2a supported by the shaping drum 14.

In known manner, when the belt structure 7 is in a centred position relative to the carcass structure 2a, the opposite halves 14a of the shaping drum 14 are moved mutually close in the axial direction, simultaneously with admission of fluid to the inside of the carcass ply or plies 3, so as to shape the carcass structure 2a into a toroidal configuration. The consequent radial expansion of the carcass ply/plies 3 brings the same to adhere against the inner surface of the belt structure 7 retained by the second transfer member 19.

Tyre 2 thus shaped lends itself to be removed from the shaping drum 14 for being submitted to a vulcanization treatment and/or other working operations provided in the work cycle.

According to an embodiment of the present invention, said at least one carcass ply 3 and/or said at least one belt layer 7a, 7b can be made by application of a plurality of strip-like elements in mutually approached relationship along the circumferential extension of said primary drum 11 and/or the auxiliary drum 15, respectively.

In more detail, in the embodiment shown in FIG. 1, the second feeding unit 17 is adapted to carry out application of belt strip-like elements 20 onto the auxiliary drum 15 to make the belt structure 7. The carcass structure 2a in turn is formed on said primary drum 11 through application of the carcass ply or plies 3, for example formed from at least one semifinished product in the form of a continuous strip wound up around the primary drum itself.

To this aim, the second feeding unit 17, not described in detail for the sake of brevity, can be for example made, if not otherwise specified in the present description, following the teachings of U.S. Pat. No. 6,702,913 in the name of the same Applicant.

The auxiliary drum 15 externally has a laying surface 21 of substantially cylindrical conformation for example, preferably formed of a plurality of circumferential sectors 22 (diagrammatically shown in FIGS. 2-4, 2a-4a, 6-8) consecutively disposed around a geometric symmetry axis X (FIG. 1) of the auxiliary drum itself and simultaneously translatable in the radial direction.

The circumferential sectors 22 being radially movable enable the diametrical sizes of the drum itself to be varied, starting from a minimum diameter at which the circumferential sectors 22 can act mutually in abutment through respective circumferential shoulders they are provided with at the laying surface 21, so as to give the latter a continuous course.

At least one robotized arm 23 is adapted to support and conveniently move the auxiliary drum 15 in front of the feeding units 16, 17 and 18 for the purpose of making the belt structure 7 and tread band 8 on the auxiliary drum itself.

Manufacture of the belt structure 7 first involves formation of a first portion 24 of each cushion insert 10 on the laying surface 21. The first portion 24 of each cushion insert 10 is made by a so-called "spiralling" operation, i.e. by application of at least one continuous elongated element (not shown) of elastomeric material in the form of substantially circumferential coils disposed close to each other around the laying surface 21.

To this aim, the first feeding unit 16 can comprise at least one delivery device 25, such as an extrusion die, carrying out supply of the continuous elongated element onto the auxiliary drum 15, while said drum is driven in rotation around a geometric axis X thereof by a motor carried by the robotized arm 23, and conveniently moved by the latter to cause distribution of the coils in a manner adapted to give a desired final conformation to the first portion 24 of the cushion insert 10 being made.

The continuous elongated element supplied by the first feeding unit 16 is preferably made up of an elastomeric material having a different composition from that used for the elastomeric material constituting the tread band 8 and sidewalls 9, respectively. In more detail, unlike the blend used for the tread band 8 and/or sidewalls 9, the elastomeric material constituting the continuous elongated element supplied by the first feeding unit for manufacture of the cushion inserts 10 has a composition comprising a rubber-metal bonding system such as: sulphur to a high percentage+ resorcin+cobalt salt, adapted to ensure an optimal anchoring with the metallic cords constituting the belt layers.

It is preferable that at least during formation of the first portions 24 of the cushion inserts 10, the auxiliary drum 15 be set to the minimum diameter to which mutual contact of the circumferential sectors 22 disposed in mutual continuity relationship corresponds. Thus the risk is eliminated that the continuous elongated element, even if applied directly in contact with the auxiliary drum 15 may break during the winding step by effect of anomalous stresses caused by undesirable surface discontinuities.

It will be appreciated that in a preferred embodiment of said building process, said continuous elongated element constituting the first portion 24 of the cushion inserts 10 can also be the interface between the belt structure 7 and carcass structure 2a, i.e. it can thus form the so-called "underbelt layer" of tyre 2.

This function is particularly advantageous in terms of practical character and execution time of the building cycle in case of use of the auxiliary drum 15 having a metal laying surface 21 as the building support for the belt structure 7, because laying of a further layer of elastomeric material as the rubber-metal interface between auxiliary drum 15 and first belt layer 7a is thus avoided.

Application of the first portions 24 of the cushion inserts 10 being completed, before starting application of the belt layer or layers 7a, 7b, 7c, the auxiliary drum 15 can be advantageously expanded starting from the minimum diameter to a predetermined first work diameter, suitable to enable correct laying of the belt strip-like elements 20 for application of the first belt layer 7a at a radially external position to the first portions themselves.

In more detail, the first work diameter has such a value that each of the belt strip-like elements 20 subsequently applied subtends an arc of a circumference on the laying surface 21, the width of which is substantially equal to a submultiple integer of the overall circumferential extension of the laying surface itself.

The robotized arm 23 carries out convenient positioning of the auxiliary drum 15 at the second feeding unit 17 and drives it in rotation, following a stepping movement for example, in synchronism with laying of the individual belt strip-like elements 20 on the laying surface 21, in such a manner that the strip-like elements themselves are applied in succession adjacent to each other, each following an orientation parallel to or suitably inclined relative to the geometric axis X.

Movement of the auxiliary drum 15 takes place according to pitches of angular width substantially equal to or in any case correlated with the angle subtended, on the laying surface 21, by each of the laid down belt strip-like elements 20. In this way, the opposite edges of respectively adjacent belt strip-like elements 20 will be mutually mating or, if necessary, spaced apart by a predetermined and constant distance on the whole circumferential extension of the obtained belt layer.

Figure 2:
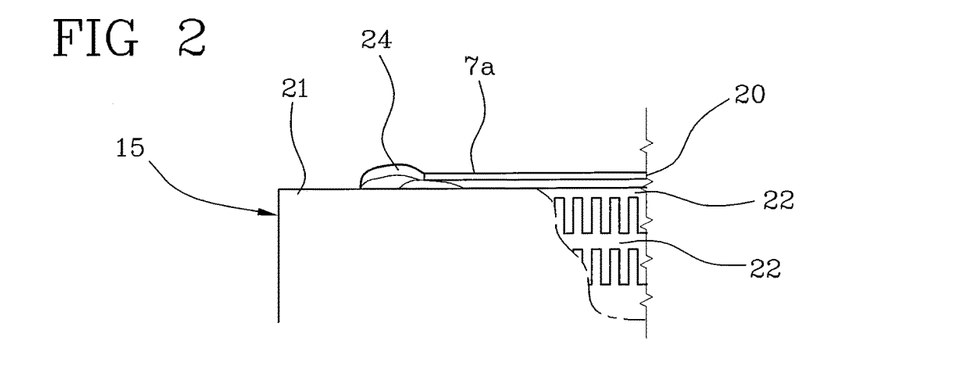
FIG. 2 shows a working step of the belt structure of a tyre in accordance with a first solution of the invention, in which a first portion of a cushion insert and a first belt layer are formed.
Figure 2A:
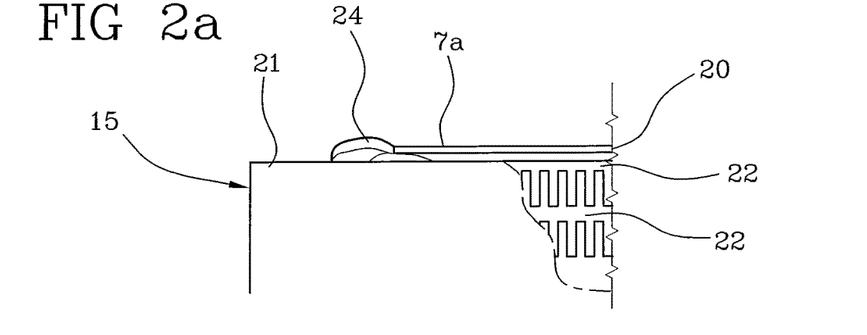
FIG. 2a shows a working step of the belt structure of a tyre according to a different solution of the invention, in which a first portion of a cushion insert and a first belt layer are formed.

As shown in FIG. 2, the individual belt strip-like elements 20 forming the first belt layer 7a are radially superposed, at least at the respective axially opposite end flaps, on the first portions 24 of the cushion inserts 10, so that said portions are coupled to the respective opposite axially external edges of the belt layer concurrently with formation of said layer. In more detail, the end flaps of the belt strip-like elements 20 partly overlap the respective first portions 24 of each cushion insert 10, so that each of the first portions 24 axially projects outwards from the respective axially external edges of the first belt layer 7a.

When manufacture of the first belt layer 7a has been completed, the robotized arm brings the auxiliary drum 15 back close to the first feeding unit 16, to cause application of a second portion 26 of each cushion insert 10, radially overlapping the first portion 24 of the respective cushion insert 10 and the corresponding axially external edge of the first belt layer 7a. The second portion 26 too is formed through spiralling, i.e. laying of at least one continuous elongated element of elastomeric material into coils disposed close to each other, at a position radially external to the corresponding axially external edge of the first belt layer 7a and to the stretch of the first portion 24 projecting from the axially external edge itself in an axially external direction. When application has been completed, the axially external edge of the first belt layer 7a is thus enclosed between the first portion 24 and second portion 26 of the cushion insert 10.

Before (FIG. 3) or after (FIG. 3a) application of the second portions 26 of the cushion inserts 10, at least one second belt layer 7b can be coupled to the first belt layer 7a, at a radially external position. The second belt layer 7b can be obtained in the same manner as previously described with reference to the first belt layer 7a, but with the belt strip-like elements 20 preferably disposed in a crossed orientation relative to those of the first layer. During manufacture of the second belt layer 7b, the laying surface 21 of the auxiliary drum 15 will be represented by the first previously formed belt layer 7a.

Figure 3:
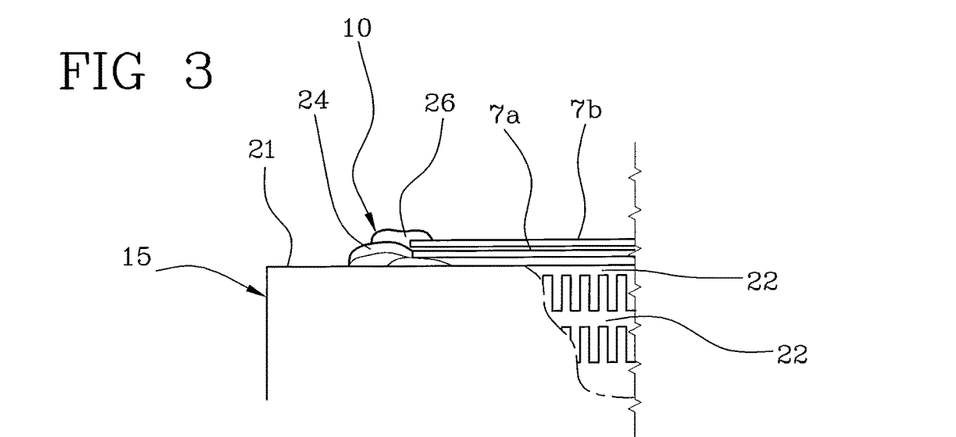
FIG. 3 shows a working step subsequent to that in FIG. 2 in which a second portion of a cushion insert is formed in radially superposed relationship with the first portion and with a second belt layer.
Figure 3A:
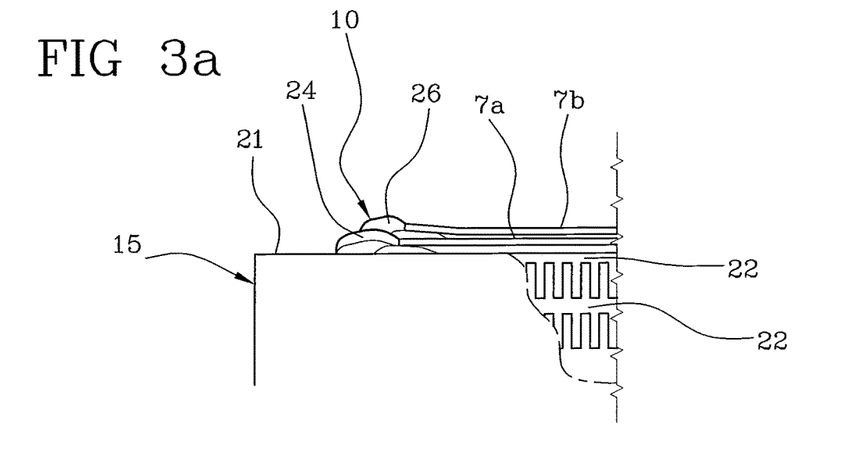
FIG. 3a shows a working step following that shown in FIG. 2a in which a second portion of a cushion insert is formed in radially superposed relationship with the first portion and interposed between said first belt layer and a second belt layer.
Figure 4:
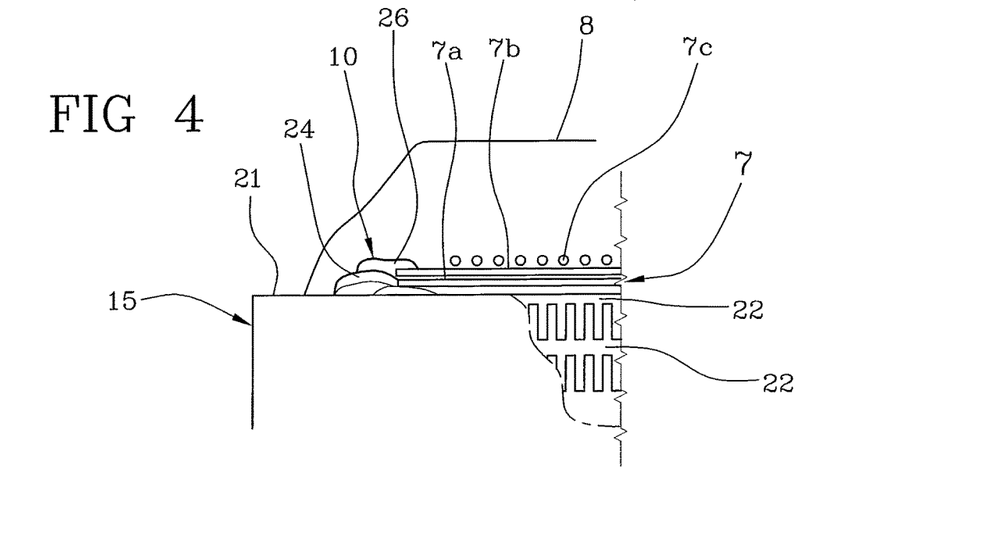
FIG. 4 shows a working step following that in FIG. 3, in which a third belt layer and a tread band radially overlapping the belt structure are formed.
Figure 4A:
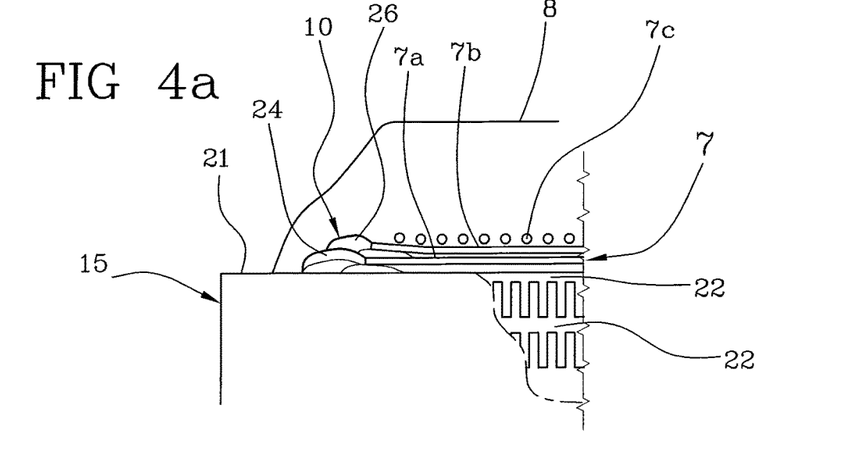
FIG. 4a shows a working step subsequent to that in FIG. 3a, in which a third belt layer and a tread band radially superposed on the belt structure are formed.

In the embodiment shown in FIGS. 2, 3 and 4, coupling of the second belt layer 7b is carried out before application of the second portion 26 of each cushion insert 10. In this case, the second portion 26 of each cushion insert 10 will be formed in superposed relationship with the respective axially external edge of the second belt layer 7b, so that the axially external edges of both the first and second belt layers 7a and 7b will be enclosed between the first and second portions 26 of each cushion insert 10.

Subsequently to formation of the second belt layer 7b, i.e. the radially outermost belt layer, the auxiliary drum 15 can be radially expanded until a predetermined second work diameter, so as to impose a permanent expansion to the annular belt layers 7a, 7b according to the desired circumferential extension determined by the design specifications. In the embodiment shown in FIGS. 2, 3 and 4, radial expansion of the auxiliary drum 15 can be carried out before or after application of the second portion 26 of each cushion insert 10 partly overlapping the second previously formed belt layer 7b.

In accordance with possible alternative embodiments shown in FIGS. 2a-4a and 6-8, coupling of the second belt layer 7b is carried out after application of the second portion 26 of each cushion insert 10, so that said second portion 26 will be partly enclosed between the respective axially external edge of the second belt layer 7b and axially external edge of the first belt layer 7a. In accordance with the variant shown in FIGS. 6-8, before or after a possible radial expansion of the auxiliary drum 15, a third portion 27 of each cushion insert 10 can be also formed, which portion too is obtained through spiralling of at least one continuous elongated element of elastomeric material into coils disposed close to each other at a radially external position to the corresponding axially external edge of the second belt layer 7b, and over a stretch of the second portion 26 projecting from said axially external edge in an axially external direction. Each of the axially external edges of the second belt layer 7b thus remains enclosed between the third portion 27 of the respective cushion insert 10 and the second portion 26 of same, said second portion 26 being radially interposed between the axially external edges of the first belt layer 7a and the second belt layer 7b.

Subsequently to manufacture of the second portion 26 or the third portion 27, i.e. the radially outermost portion, of each cushion insert 10, application of a third belt layer 7c can be provided, which layer will comprise one or more cords wound up into coils disposed axially close to each other at a radially external position to the underlying belt layers.

The auxiliary drum 15 is subsequently brought close to the third feeding unit 18 to enable application of the tread band 8 in radially superposed relationship with the belt structure 7, and possibly application of sidewalls 9 or part of same in the extension of the opposite edges of the tread band 8.

In the same manner as described with reference to the first feeding unit 16, the third feeding unit 18 can for example comprise at least one extrusion die or other suitable device adapted to supply a continuous elongated element in the form of coils (not shown) disposed close to each other and/or superposed on the belt structure 7 and/or the auxiliary drum 15, while said drum is driven in rotation and conveniently moved to cause distribution of the coils in a manner adapted to give the desired final conformation to the tread band 8 and/or the sidewalls 9 being manufactured.

To enable release of the belt structure 7, the auxiliary drum 15 can be subsequently contracted until a smaller diameter than the first work diameter. Under this circumstance the belt structure 7, together with tread band 8, possible sidewalls 9 and cushion inserts 10, can be axially slipped off the auxiliary drum 15 brought to interact with the second transfer member by the robotized arm 23, so as to be associated with the carcass structure 2a provided on the shaping drum 14, in accordance with what previously described.

Figure 9:
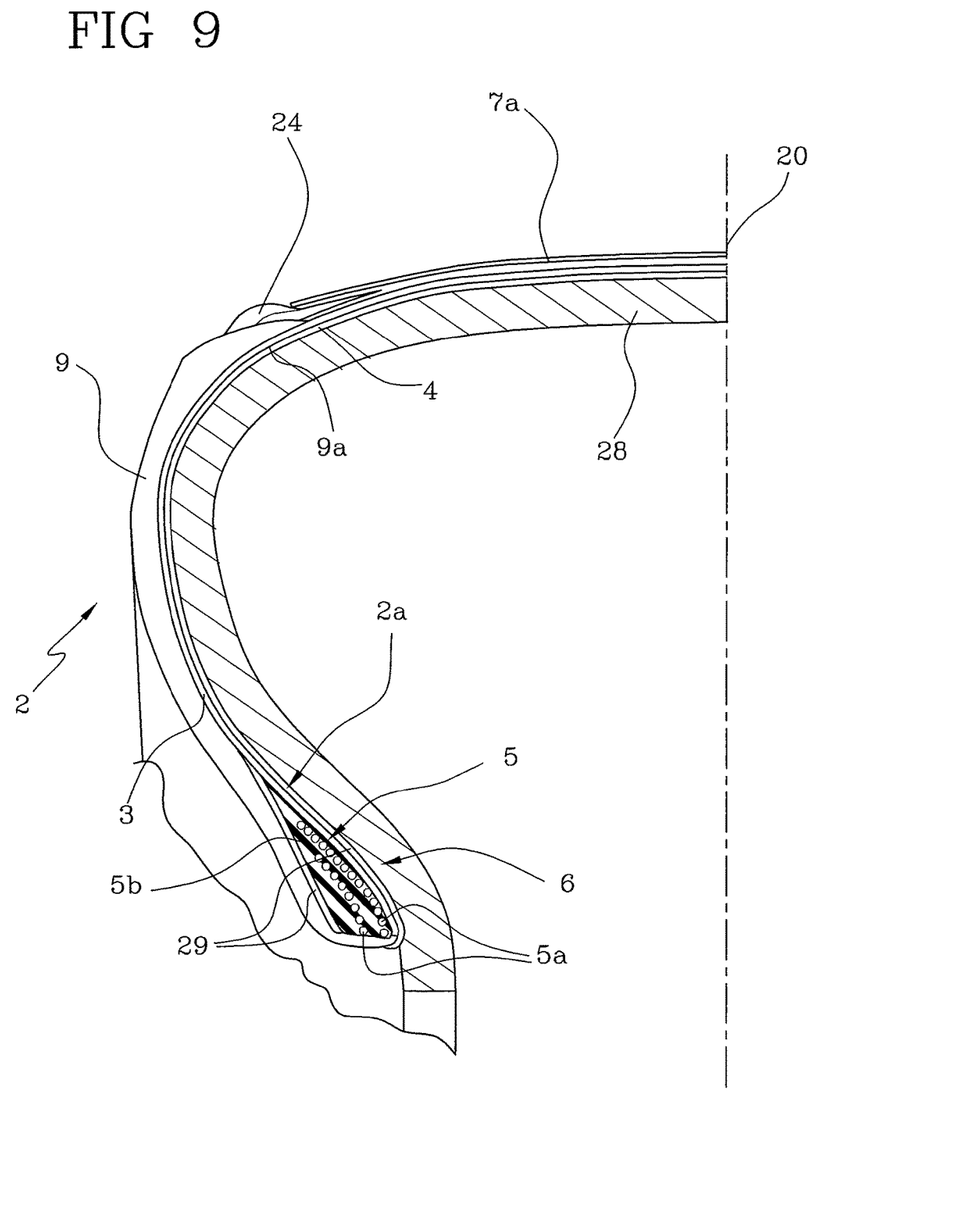
FIG. 9 shows a working step of the belt structure of a tyre according to a possible alternative embodiment of the invention, in which a first portion of a cushion insert and a first belt layer are formed.
Figure 10:
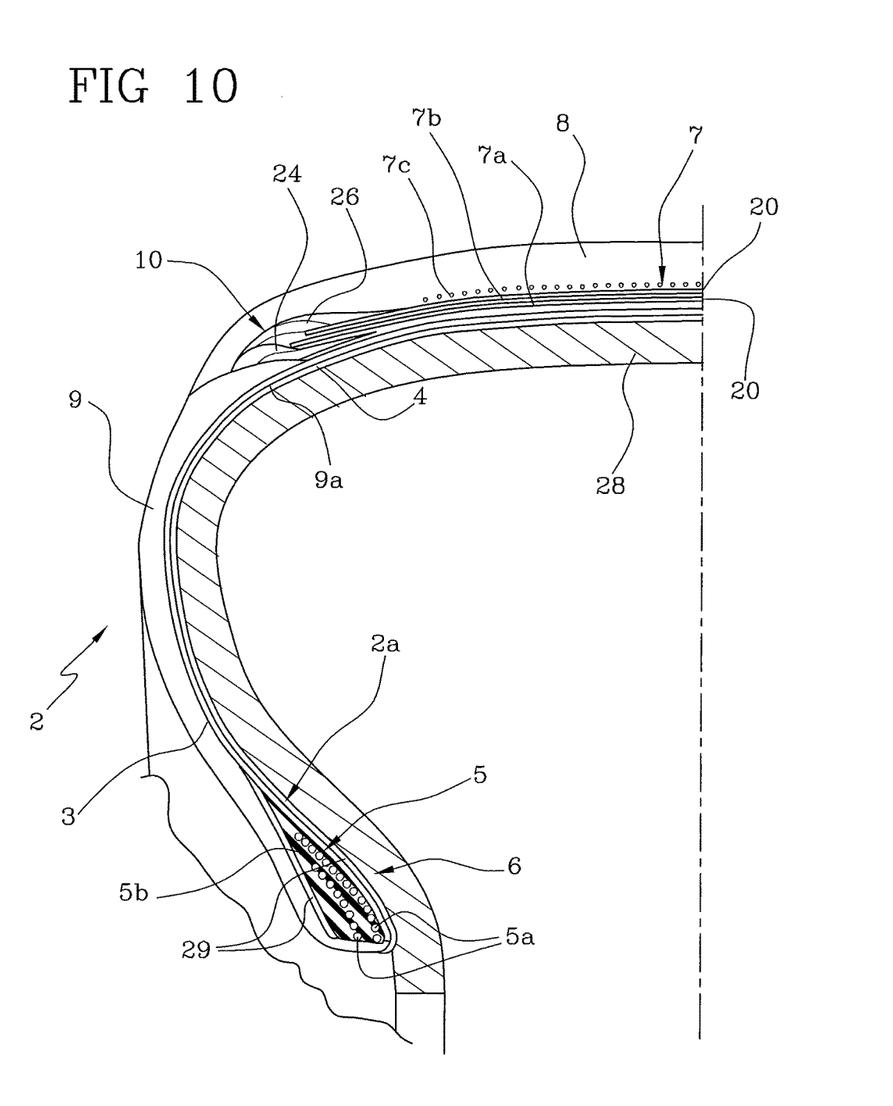
FIG. 10 shows a working step following that in FIG. 9 in which a second portion of a cushion insert in radially superposed relationship with the first portion and with a second belt layer, as well as a third belt layer and a tread band radially superposed on the belt structure are formed.

FIGS. 9 and 10 refer to a further alternative embodiment of the building process in accordance with the invention, in which the carcass structure 2, belt structure 7 and other constituent elements of the tyre being processed are directly formed by laying elementary components on a toroidal support 28. In a particular embodiment of said process, the toroidal support 28 has a conformation mating the inner configuration of the tyre.

In particular, according to this variant, manufacture of the carcass ply/plies 3 takes place through laying of carcass strip-like elements 29 disposed consecutively close to each other along the circumferential extension of the toroidal support 28, and coupling between the belt structure 7 and carcass structure 2a is obtained by forming the belt structure 7 directly on the carcass structure itself.

In this case, in manufacturing the belt structure 7 it is provided that the first portion 24 of the cushion insert 10 be directly formed on the carcass structure 2a defining said laying surface. Advantageously, an axially external edge of each first portion 24 can be radially superposed on a radially external apex 9a of the respective sidewall 9 previously made against one side of the carcass ply/plies 3 by a spiralling operation. Manufacture of the first portion 24 of each cushion insert 10 directly against the carcass ply/plies 3 and against the radially external apex 9a of the sidewall 9 carried by the toroidal support 28 is advantageous in order to obtain more accuracy in working. In this connection, the Applicant has noticed that working inaccuracies even of slight importance could greatly impair this coupling determined by an overlap typically in the order of few millimeters. However, a steady positioning of the sidewall 9 and carcass ply/plies 3 on the toroidal support 28 facilitates a precise control on coupling between first portion 24 of the cushion insert 10 and radially external apex 9a of the sidewall 9.

The first belt layer 7a is subsequently made by application of the respective belt strip-like elements 20 disposed consecutively close to each other along the circumferential extension of the carcass structure 2a by partially superposing each of the axially opposite edges of the belt layer on the first portion 24 of the cushion insert 10. Concurrently with this operation, also coupling of the first portion 24 of each cushion insert 10 to one of the axially opposite edges of the first belt layer 7a is thus obtained. The subsequent steps for manufacture of the belt structure 7 and application of the tread band 8 can be accomplished on the tyre under processing carried by the toroidal support 28 in the same manner as previously described with reference to FIGS. 2-4, 2a-4a, 6-8.

The invention claimed is:

1. A process for building a tyre comprising:
   forming a carcass structure comprising at least one carcass ply having opposite edges in engagement with respective annular anchoring structures;
   forming a belt structure comprising at least one first belt layer and at least one cushion insert enclosing an axially external edge of said at least one first belt layer; and
   forming a tread band at a position radially external to said belt structure, wherein forming said belt structure comprises at least:
   forming a first portion of said at least one cushion insert through laying of at least one continuous elongated element of elastomeric material into coils disposed close to each other on a substantially cylindrical laying surface of an auxiliary drum set to a starting diameter, the auxiliary drum is composed of consecutive circumferential sectors having respective circumferential shoulders on the laying surface with said shoulders mutually abutting when the auxiliary drum is set to a minimum diameter, wherein the circumferential sectors form the laying surface;
   after forming the first portion, radially expanding the auxiliary drum while maintaining the laying surface thereof at a substantially cylindrical shape, from the starting diameter to a first work diameter by radially moving said circumferential sectors, wherein radially moving said circumferential sectors enables diametrical sizes of the auxiliary drum to be varied;
   after said expanding, forming said at least one first belt layer at a radially external position to said first portion by application of belt strip-like elements disposed consecutively close to each other along a circumferential extension of the laying surface in such a manner that said first portion axially projects outward from the axially external edge of said at least one first belt layer; and
   forming a second portion of said cushion insert through laying of at least one continuous elongated element of elastomeric material into coils disposed close to each other in a radially external position to said axially external edge of said at least one first belt layer and to a stretch of the first portion projecting from the axially external edge in an axially external direction, so as to enclose said axially external edge between the first and second portions of the cushion insert, wherein the elastomeric material of at least one of said first portion and said second portion has a composition different from that of an elastomeric material of the tread band and a sidewall, respectively, of said tyre.

2. The process as claimed in claim 1, further comprising coupling at least one second belt layer to said first belt layer in a radially superposed relationship.

3. The process as claimed in claim 2, wherein coupling of the second belt layer is carried out before application of the second portion of the cushion insert.

4. The process as claimed in claim 2, wherein the second portion of the cushion insert is formed in superposed relationship with an axially external edge of the second belt layer, so as to enclose the axially external edges of said first and second belt layers between the first and second portions of the cushion insert.

5. The process as claimed in claim 2, wherein coupling of the second belt layer is carried out after application of the second portion of the cushion insert.

6. The process as claimed in claim 2, wherein the second portion of the cushion insert is partly enclosed between an axially external edge of the second belt layer and the axially external edge of the first belt layer.

7. The process as claimed in claim 6, further comprising forming a third portion of said cushion insert by laying at least one continuous elongated element of elastomeric material into coils disposed close to each other at a position radially external to said axially external edge of the second belt layer and on a stretch of the second portion projecting from said axially external edge in an axially external direction, so as to enclose said axially external edge of the second belt layer between the second and third portions of the cushion insert.

8. The process as claimed in claim 1, wherein at least one of said first portion and said second portion has a composition comprising at least one rubber metal bond promoter.

9. The process as claimed in claim 1, wherein coupling said first portion of the cushion insert to one of the axially external opposite edges of said at least one first belt layer is carried out through application of said at least one first belt layer around the laying surface by causing partial overlapping between one of the axially external opposite edges of the first belt layer and the first portion of the cushion insert.

10. The process as claimed in claim 1, wherein the first work diameter is of such a value that each of said belt strip-like elements applied subtends an arc of a circumference, on the laying surface, of a width equal to a submultiple integer of the overall circumferential extension of the laying surface.

11. The process as claimed in claim 10, wherein after application of said at least one first belt layer, the auxiliary drum is further radially expanded to a predetermined second work diameter by radially moving said circumferential sectors, to cause a permanent expansion of said at least one first belt layer.

12. The process as claimed in claim 11, further comprising:
    contracting the auxiliary drum, after said further radial expansion, to a diameter smaller than the first work diameter by radially moving said circumferential sectors; and
    axially removing from the auxiliary drum, the belt structure formed thereon.

13. The process as claimed in claim 1, wherein said carcass structure is formed on a primary drum through application of at least one carcass ply obtained from at least one semifinished product in the form of a continuous strip wound around the primary drum.

14. The process as claimed in claim 1, wherein said carcass structure is formed on a primary drum from a plurality of carcass strip-like elements laid down in mutually approached relationship along a circumferential extension of said primary drum.

15. The process as claimed in claim 1, further comprising coupling the belt structure to said carcass structure at a radially external position.

16. The process as claimed in claim 15, wherein coupling of the belt structure to the carcass structure comprises:
    positioning the belt structure around the carcass structure; and
    radially expanding the carcass structure until causing application thereof against an inner surface of the belt structure.

17. The process as claimed in claim 1, wherein the starting diameter is equal to the minimum diameter of the auxiliary drum.

* * * * *